(12) United States Patent
Tabata et al.

(10) Patent No.: US 8,562,828 B2
(45) Date of Patent: Oct. 22, 2013

(54) WASTEWATER TREATMENT APPARATUS

(75) Inventors: Masanori Tabata, Hiroshima-ken (JP); Masaru Chiyomaru, Hiroshima-ken (JP); Makoto Susaki, Hiroshima-ken (JP); Yukiko Shirakusa, Hiroshima-ken (JP); Kazuhide Kamimura, Hyogo-ken (JP); Tetsuya Ito, Hyogo-ken (JP); Hiroyuki Nakamura, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 883 days.

(21) Appl. No.: 10/588,936

(22) PCT Filed: Feb. 15, 2005

(86) PCT No.: PCT/JP2005/002251
§ 371 (c)(1),
(2), (4) Date: Aug. 9, 2006

(87) PCT Pub. No.: WO2005/077837
PCT Pub. Date: Aug. 25, 2005

(65) Prior Publication Data
US 2007/0170122 A1      Jul. 26, 2007

(30) Foreign Application Priority Data
Feb. 16, 2004 (JP) .................. 2004-038696

(51) Int. Cl.
*B01D 15/00* (2006.01)
*C02F 1/32* (2006.01)
*C02F 1/72* (2006.01)

(52) U.S. Cl.
USPC ............ 210/199; 210/205; 210/258; 210/259

(58) Field of Classification Search
USPC .............. 210/758, 760, 198.1, 192, 205, 748, 210/752, 209, 199, 258, 259
See application file for complete search history.

(56) References Cited

U.S. PATENT DOCUMENTS

| 5,302,356 A * | 4/1994 | Shadman et al. ......... 210/748.14 |
| 5,573,676 A * | 11/1996 | Massholder et al. .......... 210/748 |
| 6,403,030 B1 * | 6/2002 | Horton, III ............... 210/748.11 |
| 6,773,609 B1 * | 8/2004 | Hashizume .................... 210/192 |
| 2002/0117392 A1 * | 8/2002 | Noguchi et al. .............. 422/186 |

FOREIGN PATENT DOCUMENTS

| JP | 10-296299 A | 11/1998 |
| JP | 11-057753 A | 3/1999 |
| JP | 11-090165 | 4/1999 |
| JP | 2000-102793 A | 4/2000 |

(Continued)

OTHER PUBLICATIONS

Machine translation of JP 2001-129566, 2001, (foreign language copy provided by applicant).*

(Continued)

*Primary Examiner* — Lucas Stelling
(74) *Attorney, Agent, or Firm* — Lowe, Hauptman & Ham

(57) ABSTRACT

A wastewater treatment apparatus (10) that treats the wastewater containing persistent substances, according to the present invention, includes a wastewater treatment bath (12) for treating a wastewater (11), an oxidizing reagent adding unit (14) for adding an oxidizing reagent (13) in the wastewater treatment bath (12), and an alkaline reagent adding unit (16) for adding an alkaline reagent (15) in the wastewater treatment bath (12). By making the wastewater in the wastewater treatment bath (12) in the alkaline condition, it is possible to completely decompose the persistent substances in the wastewater by the oxidation treatment using an oxidizing reagent.

10 Claims, 12 Drawing Sheets

(56) References Cited

FOREIGN PATENT DOCUMENTS

| | | |
|---|---|---|
| JP | 2001-104971 A | 4/2001 |
| JP | 2001-129566 A | 5/2001 |
| JP | 2001-129569 A | 5/2001 |
| JP | 2001-212597 A | 8/2001 |
| JP | 2003-062583 A | 3/2003 |
| JP | 2003-190954 A | 7/2003 |
| JP | 2003-305467 A | 10/2003 |
| JP | 2004-024995 A | 1/2004 |
| WO | WO0130706 A1 * | 5/2001 |

OTHER PUBLICATIONS

Zhao Shi-Jie et al., "Cyanide-Removing Treatment of Washing Water for Blast Furnace Gas", Metallurgical Power, the First term of 2002, No. 89, Feb. 28, 2002, pp. 34 to 36.
Chinese Patent Office, Office Action.
Japanese Patent Office, Office Action mailed Jan. 19, 2010.

* cited by examiner

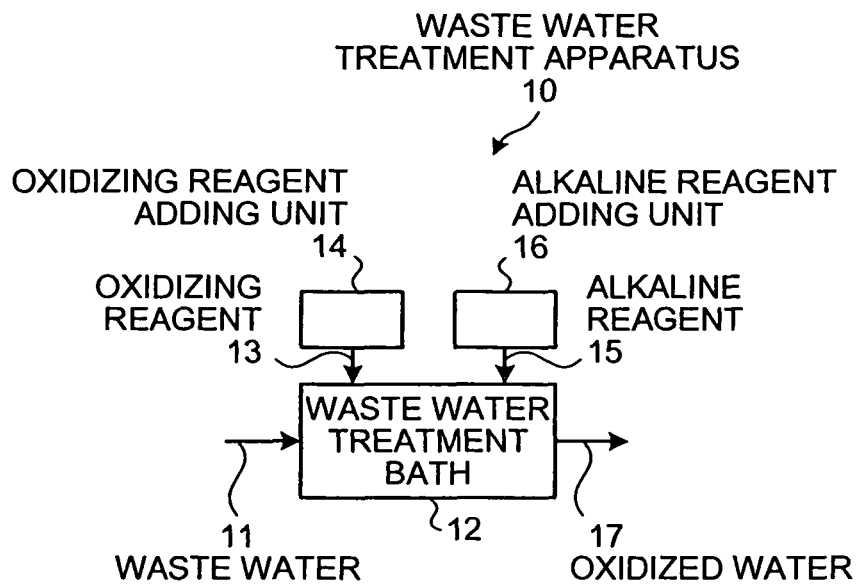
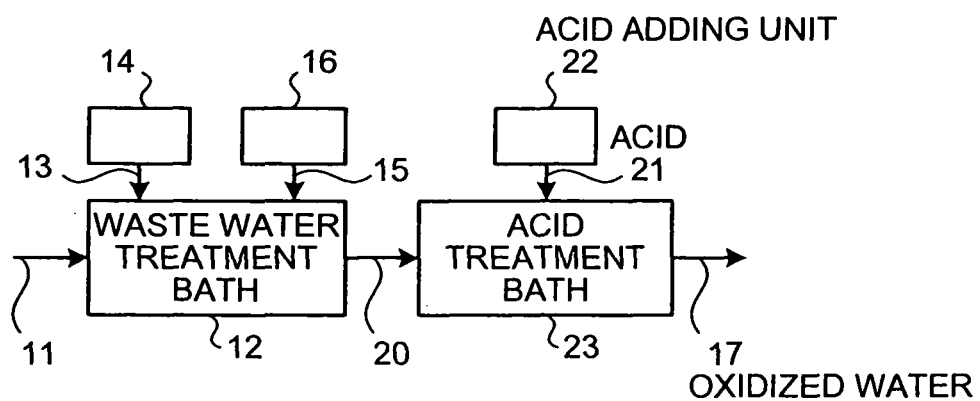

WASTEWATER TREATMENT APPARATUS

RELATED APPLICATIONS

The present application is a National Phase application based on International Application Number PCT/JP2005/002251, filed Feb. 15, 2005, which claims priority from, Japanese Application Number 2004-038696, filed Feb. 16, 2004, the disclosure of which is hereby incorporated by reference herein in its entirety.

TECHNICAL FIELD

The present invention relates to a wastewater treatment apparatus capable of removing COD components contained in, for example, gas washing wastewater produced in a coal gasification process.

BACKGROUND ART

For example, in a wastewater produced in a process of purifying exhaust gas discharged from a coal gasification furnace, so-called COD (Chemical Oxygen Demand) components, such as organic materials, are contained. It has been difficult to remove the COD components by a coagulation sedimentation process, which involves a step of adding any of coagulants, such as iron chloride and PAC.

An oxidation treatment with any of oxidizing reagents, such as sodium hypochlorite (NaClO) and hydrogen peroxide can not achieve high efficiency, limiting a removal rate of a COD component to as a low level as approximately 60%.

Even if a treatment with ozone, a further strong oxidizing reagent, is applied, the removal rate is at the level of 80%, and thereby, this treatment also can not satisfy a given effluent standard if a COD concentration is high. Furthermore, it is exceptionally difficult for activated carbon to absorb this type of COD components, resulting in consumption of a large amount of activated carbon to satisfactorily treat the COD components.

In order to treat COD containing wastewater contained in such a refractory coal gasification wastewater, it has been proposed that the COD components are contacted with weakly or moderately basic anion exchange resin so as to absorb the COD components to the anion exchange resin (Patent Document 1).

Patent Document 1: Japanese Patent Application Laid-Open No. 2003-305467

DISCLOSURE OF INVENTION

Problem to be Solved by the Invention

However, this method has a problem in that although the COD components are removed from the wastewater, the anion exchange resin saturated with the COD components are accumulated in the form of solid waste. Moreover, although a recovery of the resin may eliminate the need for disposition of the resin, an amount of the recovered water can be decreased but can not be discharged because the recovered water contains the concentrated COD components. To address this problem, it is required that a water content be evaporated to precipitate the COD components and dispose the COD components as a solid waste.

A treating method is strongly desired that reliably treat the COD components without producing waste.

In particular, an appearance of a technique is expected that reliably decomposes the COD components such as thiosulfuric ions and formic acid, which are persistent substances in the wastewater discharged from a coal gasification facility.

In this context, an object of the present invention is to provide the wastewater treatment apparatus that reliably treats the COD components without producing waste.

Means for Solving Problem

The first invention according to the present invention for solving the above mentioned problem is characterized in that a wastewater treatment apparatus that treats a wastewater containing persistent substances includes a wastewater treatment bath for treating the wastewater, an oxidizing reagent adding unit for adding an oxidizing reagent in the wastewater treatment bath, and an alkaline reagent adding unit for adding an alkaline reagent in the wastewater treatment bath.

The second invention is characterized in that a wastewater treatment apparatus that treats a wastewater containing persistent substances includes a wastewater treatment bath for treating the wastewater, an oxidizing reagent adding unit for adding an oxidizing reagent in the wastewater treatment bath, and an ultraviolet treatment unit for irradiating an ultraviolet ray.

The third invention is characterized in that, in the second invention, an alkaline reagent adding unit for adding an alkaline reagent in the wastewater treatment bath is provided.

The fourth invention is characterized in that, in the first or second invention, an acid treatment bath having an acid adding unit for adding an acid is provided on the downstream side of the wastewater treatment bath.

The fifth invention is characterized in that, in the first or second invention, a concentration ratio of (oxidizing reagent carried-in effective oxygen amount (mg/L))/COD concentration in wastewater (mg/L)) in the wastewater treatment bath falls within a range from 10 to 0.7.

The sixth invention is characterized in that, in the second invention, a concentration ratio of (oxidizing reagent carried-in effective oxygen amount (mg/L))/COD concentration in wastewater (mg/L)) in the ultraviolet treatment unit falls within a range from 20 to 0.5.

The seventh invention is characterized in that, in the second invention, a pH of the wastewater treatment bath falls within a range from 7 to 12.

The eighth invention is characterized in that, in the fourth invention, a pH of the acid treatment bath falls within a range from 2 to 6.

The ninth invention is characterized in that, in the second invention, an activated carbon bath and a neutralizing bath are provided on the downstream side of the ultraviolet treatment unit.

The tenth invention is characterized in that, in the second invention, a pH adjusting unit is provided on the front stream side of the ultraviolet treatment unit.

The eleventh invention is characterized in that, in the second invention, a reducing bath is provided on the downstream side of the ultraviolet treatment unit.

The twelfth invention is characterized in that, in the eleventh invention, an aeration bath is provided on the downstream side of the reducing bath.

The thirteenth invention is characterized in that, in any one of the first to the twelfth inventions, an activated carbon absorbing unit for removing organic materials and/or a filtering unit for removing suspended matters in the wastewater is provided as a pre-processing unit.

Effect of the Invention

According to the present invention, persistent substances in a wastewater may be decomposed by treating it with an oxidizing reagent under an alkaline condition.

The persistent substances may be further treated by oxidizing it with an oxidizing reagent under an alkaline condition followed by oxidizing it with an oxidizing reagent under an acidic condition.

Further, the persistent substances may be decomposed by oxidizing it with an oxidizing reagent followed by irradiating an ultraviolet ray on it.

In particular, where the wastewater produced in a gas purification process and discharged from the gasification facility is treated, COD components of the gasified wastewater may be efficiently treated by combining oxidization of thiosulfuric ions by adding an oxidizing reagent and decomposition of organic materials including formic acid through an advanced oxidation process using a combination of an ultraviolet ray and an oxidizing reagent.

BRIEF DESCRIPTION OF DRAWINGS

FIG. 1 is a schematic diagram of a wastewater treatment apparatus according to Embodiment 1.

FIG. 2 is a schematic diagram of a wastewater treatment apparatus according to Embodiment 2.

Figure 3:
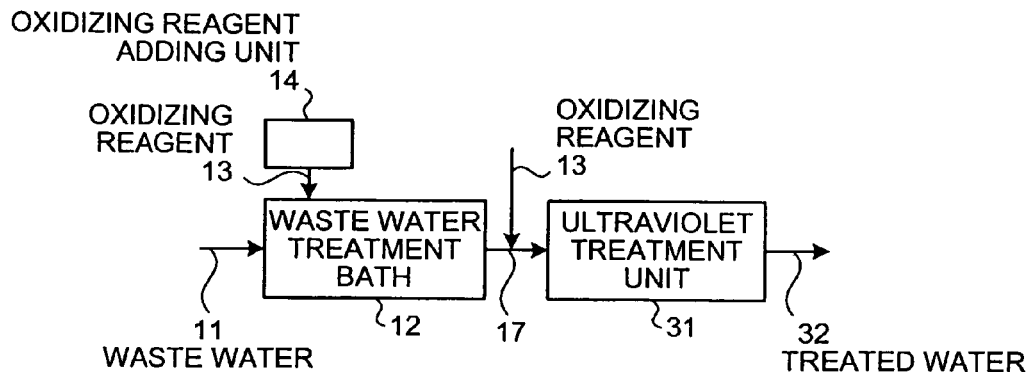
FIG. 3 is a schematic diagram of a wastewater treatment apparatus according to Embodiment 3.

EXPLANATIONS OF LETTERS OR NUMERALS 10 wastewater treatment apparatus
11 wastewater
12 wastewater treatment bath
13 oxidizing reagent
14 oxidizing reagent adding unit
15 alkaline reagent
16 alkaline reagent adding unit

BEST MODE(S) FOR CARRYING OUT THE INVENTION

Exemplary embodiments of the present invention are described in detail below in reference to accompanying drawings. These embodiments do not limit the present invention. Constituting elements in the embodiments described below contain those, which are easily thought out by the person skilled in the art and which are substantially identical.

Embodiment 1

A wastewater treatment apparatus according to Embodiment 1 of the present invention is described below in reference to accompanying drawings.

FIG. 1 is a schematic diagram of a wastewater treatment apparatus according to Embodiment 1.

As shown in FIG. 1, a wastewater treatment apparatus 10 is a wastewater treatment apparatus that treats wastewater containing persistent substances and is composed of a wastewater treatment bath 12 for treating a wastewater 11, an oxidizing reagent adding unit 14 for adding an oxidizing reagent 13 in the wastewater treatment bath 12, and an alkaline reagent adding unit 16 for adding an alkaline reagent 15 to the wastewater treatment bath 12.

Herein, the persistent substances in the wastewater described in connection with the present invention are so-called COD components, which may include thiosulfuric acid, formic acid, cyanogen, thiocyanogen, phenol, benzene, benzoic acid, chlorophenol, chloroaniline, aminobenzoic acid, acetic acid, and hydantoin, but do not limited to them. Taking thiosulfuric acid and formic acid as examples, the persistent substances are described below.

Herein, the wastewater containing persistent substances described in connection with are exemplified by, for example, a wastewater discharged from the gasification facility, from a facility of manufacturing chemical products and drugs, and from any other general factory. The present invention, however, does not limit to these substances and therefore, is suitable for decomposing treatment of the wastewater and an aqueous solution containing the persistent substances described above.

The oxidizing reagent may be added in the wastewater treatment bath 12 so that a concentration ratio (oxidizing reagent carried-in effective oxygen amount (mg/L))/COD concentration in wastewater (mg/L)) falls within a range from 10 to 0.7.

This is because if the concentration ratio of (oxidizing reagent carried-in effective oxygen amount (mg/L))/COD concentration in wastewater (mg/L)) is less than 0.7, a decomposition of the COD components proceeds insufficiently and an oxidization effect do not emerge, while if the concentration ratio of (oxidizing reagent carried-in effective oxygen amount (mg/L))/COD concentration in wastewater (mg/L)) is more than 10, no restriction is imposed from the standpoint of chemical reactions, but a consumption of the oxidizing reagent is undesirable from a viewpoint of an economical efficiency.

The oxidizing reagent 13 may be exemplified by sodium hypochlorite, hydrogen peroxide, ozone and the like.

The alkaline reagent 15 may be added in the wastewater treatment bath 12 so that a pH value falls within a range from 7 to 12. The range of the pH value is preferably 7 to 11 and more preferably 8 to 10.

Herein, in the case of COD treatment, the COD components are decomposed under the alkaline condition but the pH range is not limited especially. The pH value may be selected so that it approximates the pH value of the wastewater from an economical viewpoint, accompanying small amount of alkaline reagent consumption.

The alkaline reagent is not especially limited and may be exemplified by, for example, sodium hydroxide.

A treatment time required for treating the wastewater using the equipment is not especially limited but is preferably several minutes to several hours and more preferably 30 minutes to 3 hours.

The wastewater treatment apparatus according to Embodiment 1 allows the persistent substances in the wastewater to be completely decomposed by oxidizing with the oxidizing reagent provided that the wastewater treatment bath 12 is put under an alkaline condition.

The oxidized water 17 may be discharged after its pH value being adjusted, for example in a neutralizing unit, so that it satisfies the wastewater standard.

Embodiment 2

FIG. 2 is a schematic diagram of a wastewater treatment apparatus according to Embodiment 2 of the present invention.

Constituting members identical to those of the wastewater treatment apparatus according to Embodiment 1 have the same letters and symbols assigned and the descriptions of these constituting members are omitted.

As shown in FIG. 2, the wastewater treatment apparatus according to Embodiment 2 has an acid treatment bath 23 having an acid adding unit 22 for adding an acid 21 provided on a downstream side of the wastewater treatment bath 12 in the apparatus according to Embodiment 1. The acid treatment bath 23 treats under an acid condition the water 20 oxidized under an alkaline condition.

Herein, the acid 21 to be added may be exemplified by sulfuric acid and hydrochloric acid.

The acid 21 may be added in the acid treatment bath 23 so that a pH value falls within a range from 2 to 6. This is because the pH value outside of this range inhibits the persistent substances from being sufficient oxidation. The pH value in the acid treatment bath 23 is preferably pH 2 to 4 and more preferably pH 2 to 3.

Acidification reaction sufficiently progresses on the stronger acid side with a lower pH value. However, the pH value may be selected totally considering the pH value and the amount of acid chemical to be used in a next process.

Thus, the wastewater treatment bath 12 treats the persistent substances with the oxidizing reagent under the alkaline condition and then the acid treatment bath 23 treats the persistent substances with the oxidizing reagent under the acid condition. Therefore, when the COD substance is thiosulfuric acid, first the acid is treated with, for example pH 8 to 10 of weak alkaline reagent, and second, treated with, for example pH 2 to 3. Accordingly, the thiosulfuric acid can be oxidized almost completely into sulfate ions even if the thiosulfuric acid decomposes down only to its intermediate under alkaline condition.

Embodiment 3

A wastewater treatment apparatus according to Embodiment 3 is described in reference to the accompanying drawings.

FIG. 3 is a schematic diagram of a wastewater treatment apparatus according to Embodiment 3.

Constituting members identical to those of the wastewater treatment apparatus according to Embodiments 1 and 2 have the same letters and symbols assigned and the descriptions of these constituting members are omitted.

As shown in FIG. 3, a wastewater treatment apparatus is a wastewater treatment apparatus that treats wastewater containing persistent substances and is composed of a wastewater treatment bath 12 for treating a wastewater 11, the oxidizing reagent adding unit 14 for adding an oxidizing reagent 13 in the wastewater treatment bath 12, and an ultraviolet treatment unit 31 for irradiating an ultraviolet ray.

The amount of the oxidizing reagent 13 to be added in the wastewater treatment bath 12 is identical to that according to Embodiment 1.

The oxidizing reagent may be added if necessary so that the concentration ratio of (oxidizing reagent carried-in effective oxygen amount (mg/L))/COD concentration in wastewater (mg/L)) in the ultraviolet treatment unit falls within a range from 20 to 0.5.

An UV dose (Watt)/inflowing COD amount (g/h) in the ultraviolet treatment unit may be adjusted so that it falls within a range from 5 to 500. This is because if the UV dose (Watt)/inflowing COD amount (g/h) in the ultraviolet treatment unit is less than 5, the decomposition of the COD components is not effective, while any value more than 500 is not preferable from the aspect of a power consumption increase and an economical efficiency.

As an ultraviolet irradiating unit, an ultraviolet lamp that emits an ultraviolet ray with 10 to 390 nm of wavelength may be used. Further, a low-voltage ultraviolet lamp with 254 nm of dominant wavelength is preferably used. Any unit that emits the ultraviolet ray may be used and not limited to the ultraviolet lamp.

In UV oxidization in the ultraviolet treatment unit, any pH value may be selected in a range from 1.5 to 7 and preferably, from 2 to 5 and more preferably, from 2 to 4.

Figure 12:
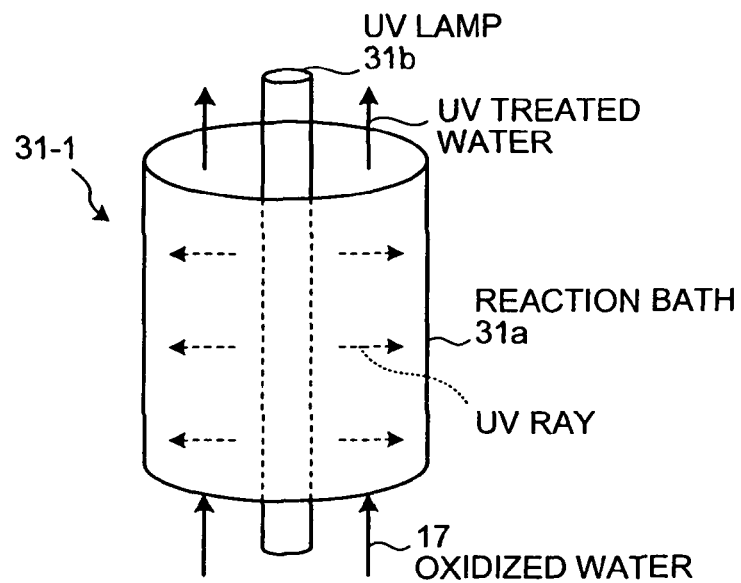
FIG. 12 is a schematic diagram of a first ultraviolet treatment apparatus.
Figure 13:
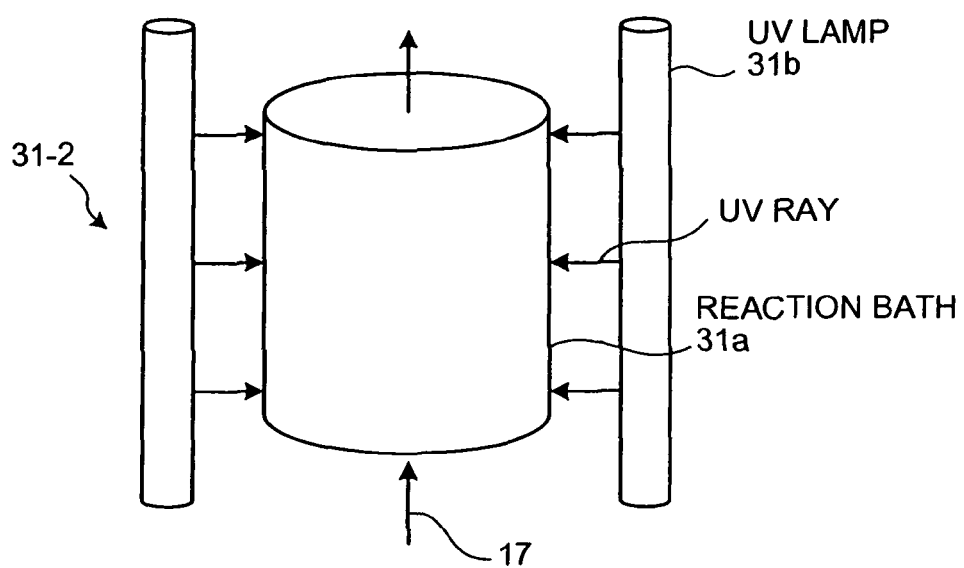
FIG. 13 is a schematic diagram of a second ultraviolet treatment apparatus.
Figure 14:
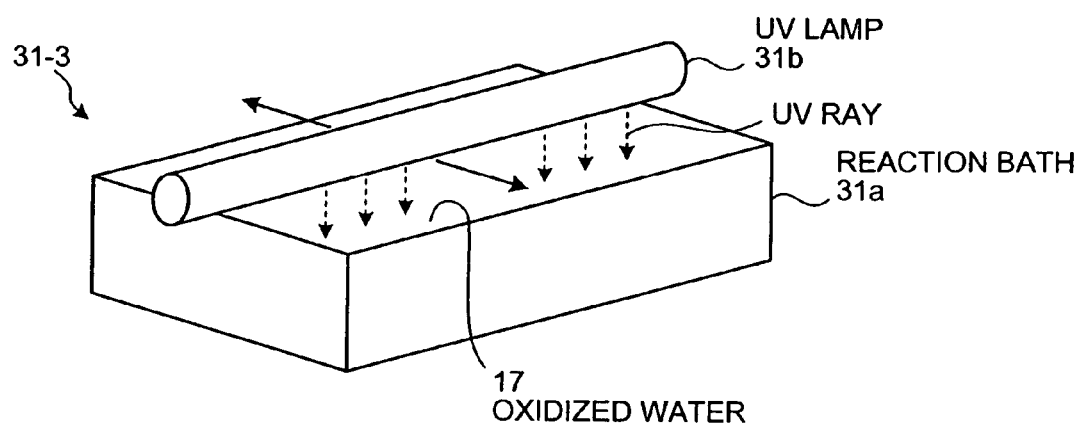
FIG. 14 is a schematic diagram of a third ultraviolet treatment apparatus.

FIGS. 12 to 14 show an example of operational principle of the ultraviolet treatment unit.

FIG. 12 is a schematic diagram of a first ultraviolet treatment unit 31-1. The ultraviolet treatment unit 31-1 is composed of a reaction bath 31a for forcing the oxidized water 17 to inflow and an ultraviolet lamp 31b (hereinafter, simply referred to as the "UV lamp") covered with a cylindrical ultraviolet-transmitting glass tube provided inside the reaction bath 31a. The ultraviolet ray 6 (hereinafter, simply referred to as the "UV") emitted from the UV lamp 31b passes through the glass tube and is irradiated on the oxidized water 17 to decompose the COD components in the oxidized water 17.

FIG. 13 is a schematic diagram of a second ultraviolet treatment unit 31-2. The ultraviolet treatment unit 31-2 is composed of an UV-transmitting reaction bath 31a for forcing the oxidized water 17 to inflow and an UV lamp 31b disposed outside of the reaction bath 31a. The UV 6 emitted from the UV lamp 31b passes through the reaction bath 31a and is irradiated on the oxidized water 17 to decompose the COD components in the oxidized water 17.

FIG. 14 is a schematic diagram of a third ultraviolet treatment unit 31-3. The ultraviolet treatment unit 31-3 is composed of a reaction bath 31a for forcing the oxidized water 17 to inflow and an UV lamp 31b disposed above the level of the oxidized water of the reaction bath 31a. The UV 6 is irradiated from the UV lamp 31b to decompose the COD components in the oxidized water 17.

In the ultraviolet treatment unit, the oxidizing reagent is contained in the treated water. When the UV is irradiated to the oxidizing reagent, a hydroxyl radical (OH*) is produced.

The use of, for example hydrogen peroxide, as the oxidizing reagent promotes the following reaction:

$$2H_2O_2 + UV \rightarrow 2OH^*$$

The use of, for example hypochlorous acid, as the oxidizing reagent progresses the following reaction:

$$OCl + UV \rightarrow Cl^* + O^*$$

$$O_2 + O^* + H_2O + UV \rightarrow 2OH^* + O_2$$

This hydroxyl radical is highly reactive and its oxidation-reduction potential is higher than that of ozone as shown in Table 1.

The hydroxyl radical has low selectivity to a target, to which it reacts, than that of ozone and therefore, may oxidize a wide variety of organic materials.

[Table 1]

TABLE 1

|  | Oxidation-Reduction Potential |
|---|---|
| OH* | 2.80 V |
| $O_3$ | 2.07 V |
| $H_2O_2$ | 1.77 V |
| $Cl_2$ | 1.36 V |

The treatment according to Embodiment 3 is described below.

As shown in FIG. 3, the wastewater 11 is fed to the oxidization process in the wastewater treatment bath 12. In this oxidization process, the oxidizing reagent 13 is added in the wastewater treatment bath 12 for oxidization.

Next, the wastewater 11 is fed to the UV reaction process in the ultraviolet treatment unit 31. Here, if the concentration of the oxidizing reagent is too low to be treated by the UV irradiation, the oxidizing reagent 13 is added prior to the initiation of the UV reaction process. In the UV reaction process, the UV is irradiated to decompose the organic materials, for example formic acid. At this stage, the COD components have been treated down to the level lower than that of the wastewater standard.

Thus, the oxidization process with the oxidizing reagent 13 is performed in the wastewater treatment bath 12, followed by the UV treatment is executed in the ultraviolet treatment unit 31. Accordingly, the organic materials, for example formic acid, may be decomposed, and further reducing COD content in the treated water 32 can be achieved compared with Embodiments 1 and 2.

Figure 4:
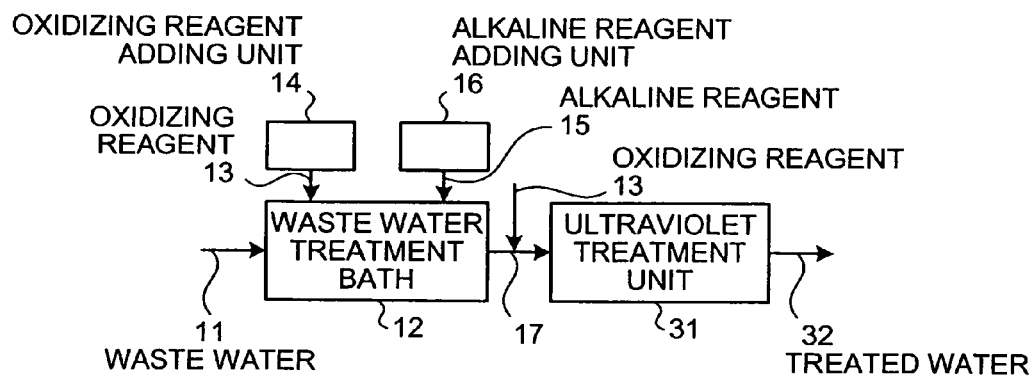
FIG. 4 is a schematic diagram of another wastewater treatment apparatus according to Embodiment 3.

As shown in FIG. 4, it is possible that an alkaline reagent adding unit 16 for adding the alkaline reagent 13 in the wastewater treatment bath 12 is provided to facilitate the wastewater treatment in the wastewater treatment bath 12 under alkaline condition.

Embodiment 4

A wastewater treatment apparatus according to Embodiment 4 of the present invention is described below in reference to the accompanying drawings.

Figure 5:
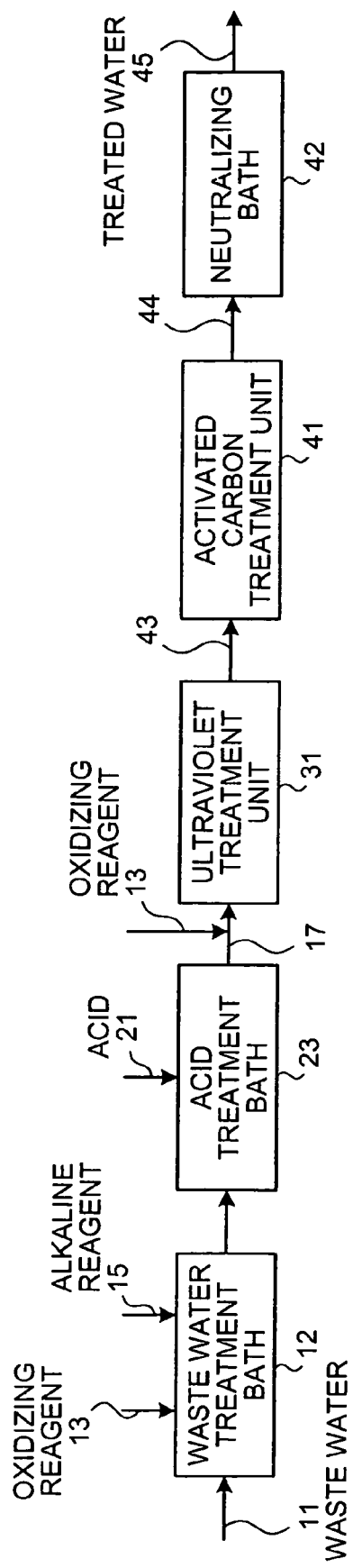
FIG. 5 is a schematic diagram of a wastewater treatment apparatus according to Embodiment 4.

FIG. 5 is a schematic diagram of a wastewater treatment apparatus according to Embodiment 4.

Constituting members identical to those of the wastewater treatment apparatus according to Embodiments 1 to 3 have the same letters and symbols assigned and the descriptions of these constituting members are omitted. The description of units of supplying the oxidizing reagent, alkaline reagent and acid is also omitted (the same is applied to the following Embodiments).

As shown in FIG. 5, the wastewater treatment apparatus according to Embodiment 4 has an activated carbon treatment unit 41 and a neutralizing bath 42 are provided on a downstream side of the ultraviolet treatment unit 31 for irradiating the UV in the apparatus according to Embodiment 3. In this Embodiment, the unit according to Embodiment 3 shown in FIG. 4 is used with an exception that an acid treatment bath 23 is provided on the downstream side of the oxidizing process in the wastewater treatment bath 12 and then the oxidized water is treated in the ultraviolet treatment unit 31 as shown in FIG. 2 according to Embodiment 2 (hereinafter, the same is applied to the following Embodiments).

Since the excessive oxidizing reagent 13 is left in the UV treatment water 43 treated in the ultraviolet treatment unit 31, an activated carbon treatment unit 41 is provided to reduce the excessive oxidizing reagent 13 here. Further, in the activated carbon treatment unit 41, some of remaining organic materials are absorbed by the activated carbon to finally treat the COD components.

After the water 44 treated through the activated carbon is fed to a neutralizing bath 42 for neutralizing with an acid or alkaline reagent and adjusted to the pH value set forth in the wastewater standard, the treated water 45 is discharged.

Embodiment 5

A wastewater treatment apparatus according to Embodiment 5 of the present invention is described below in reference to the accompanying drawings.

Figure 6:
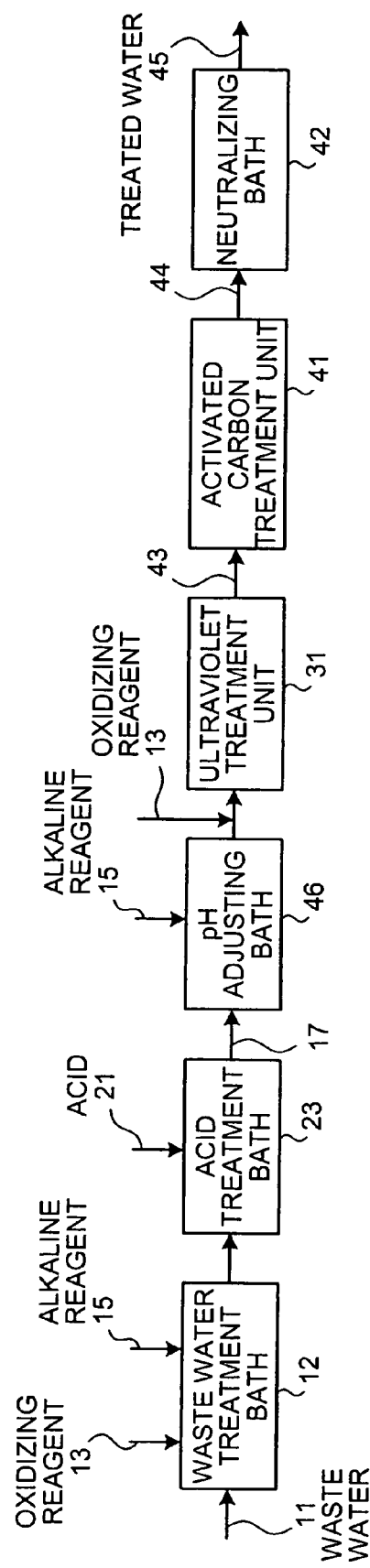
FIG. 6 is a schematic diagram of a wastewater treatment apparatus according to Embodiment 5.

FIG. 6 is a schematic diagram of a wastewater treatment apparatus according to Embodiment 5.

Constituting members identical to those of the wastewater treatment apparatus according to Embodiments 1 to 4 have the same letters and symbols assigned and the descriptions of these constituting members are omitted.

As shown in FIG. 6, in the wastewater treatment apparatus according to Embodiment 5, a pH-adjusting bath 46 is provided on the front stream side of the ultraviolet treatment unit 31 for irradiating the UV in the wastewater treatment apparatus according to Embodiment 4.

The ultraviolet treatment unit 31 is usually made of stainless steel. On the stainless steel, an erosion tends to progress when making contact with acidic water containing several hundreds mg/L of chlorine ions and thereby, the pH value is desirably 3 or more. To achieve it, the pH adjusting bath 46 is disposed between the acid treatment bath 23 and the ultraviolet treatment bath 31 to add the alkaline reagent 15 and adjust so that the pH value exceeds pH 3.

Embodiment 6

A wastewater treatment apparatus according to Embodiment 6 of the present invention is described below in reference to the accompanying drawings.

Figure 7:
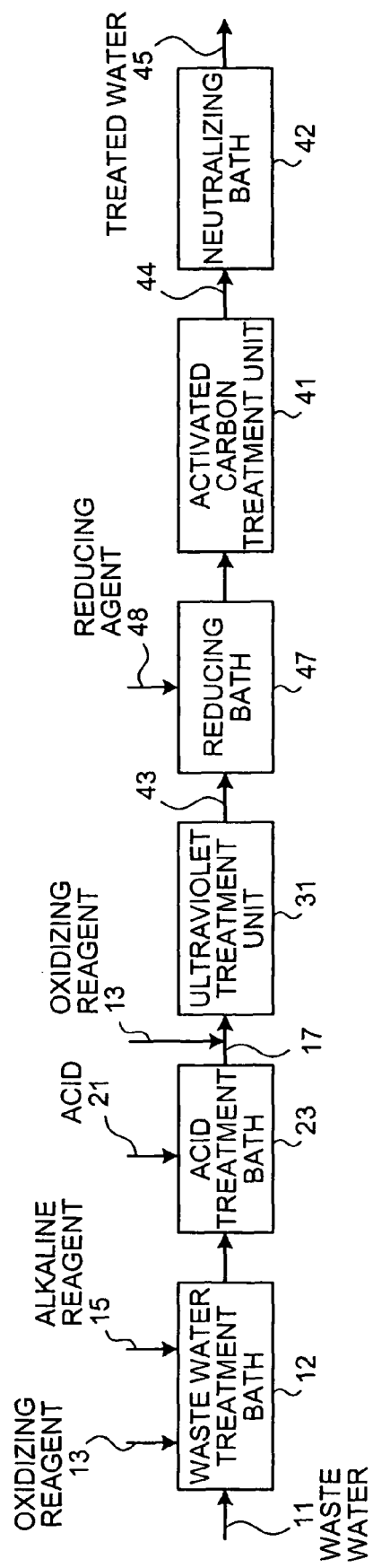
FIG. 7 is a schematic diagram of a wastewater treatment apparatus according to Embodiment 6.

FIG. 7 is a schematic diagram of a wastewater treatment apparatus according to Embodiment 6.

Constituting members identical to those of the wastewater treatment apparatus according to Embodiments 1 to 5 have the same letters and symbols assigned and the descriptions of these constituting members are omitted.

As shown in FIG. 7, in the wastewater treatment apparatus according to Embodiment 6, a reducing bath 47 is provided on the front stream side of the activated carbon treatment unit 41 in the apparatus according to Embodiment 4.

Higher concentration of the oxidizing reagent left in the ultraviolet treatment unit 43 increases the consumption amount of an activated carbon in the activated carbon treatment unit 41.

As shown in the following reaction formulas, the activate carbon reacts with the oxidizing reagent and is turned into carbon dioxide, thereby reducing in amount.

$$2ClO^- + C \rightarrow 2Cl^- + CO_2$$

$$2H_2O_2 + C \rightarrow 2H_2O + CO_2$$

For this reason, the reducing bath 47 is disposed between the ultraviolet treatment unit 31 and the activated carbon treatment unit 41 to reduce the wastewater so that the concentration of the oxidizing reagent becomes 100 mg/L or lower and preferably, 50 mg/L or lower by adding the reducing reagent, for example sulfite salt. The remaining oxidizing reagent is treated in the activated carbon treatment unit 41.

The reducing reagent 48 is exemplified by, for example sodium bisulfite and sodium sulfite.

Embodiment 7

A wastewater treatment apparatus according to Embodiment 7 of the present invention is described below in reference to the accompanying drawings.

Figure 8:
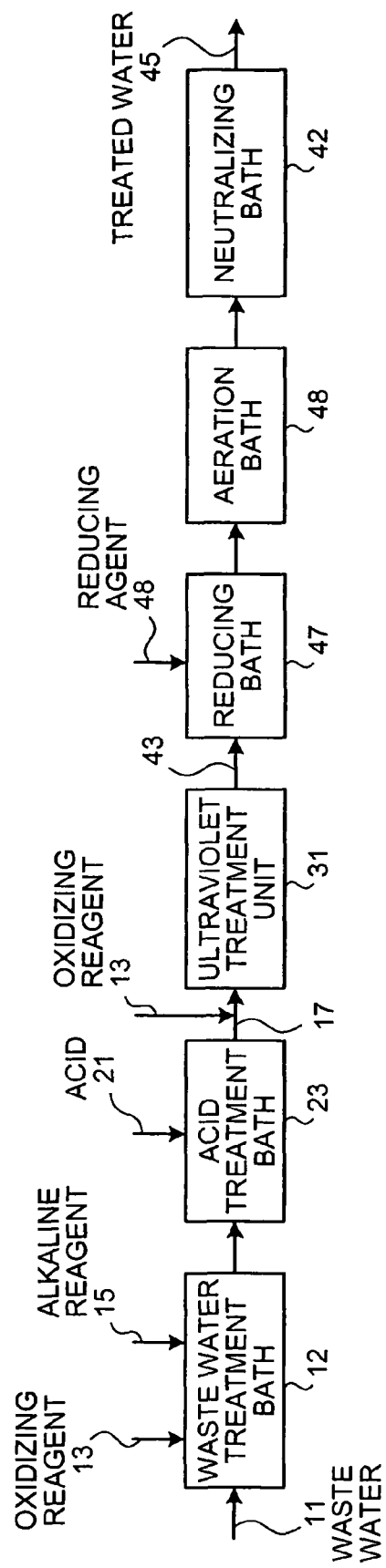
FIG. 8 is a schematic diagram of a wastewater treatment apparatus according to Embodiment 7.

FIG. 8 is a schematic diagram of a wastewater treatment apparatus according to Embodiment 7.

Constituting members identical to those of the wastewater treatment apparatus according to Embodiments 1 to 6 have the same letters and symbols assigned and the descriptions of these constituting members are omitted.

As shown in FIG. 8, in a wastewater treatment apparatus according to Embodiment 7, an aeration bath 48 is provided on the downstream side of the reducing bath 47 instead of the activated carbon treatment unit 41 in the apparatus according to Embodiment 6.

In the reducing bath 47, it may be possible that sulfite ions are left by adding an excessive reducing reagent 48 that produces, for example sulfite ions. In this case, as shown in FIG. 8, the aeration bath 48 is provided instead of the activated carbon treatment unit 41 to blow air, thereby oxidizing excessive sulfite ions into sulfate ions.

Embodiment 8

A wastewater treatment apparatus according to Embodiment 8 of the present invention is described below in reference to the accompanying drawings.

Figure 9:
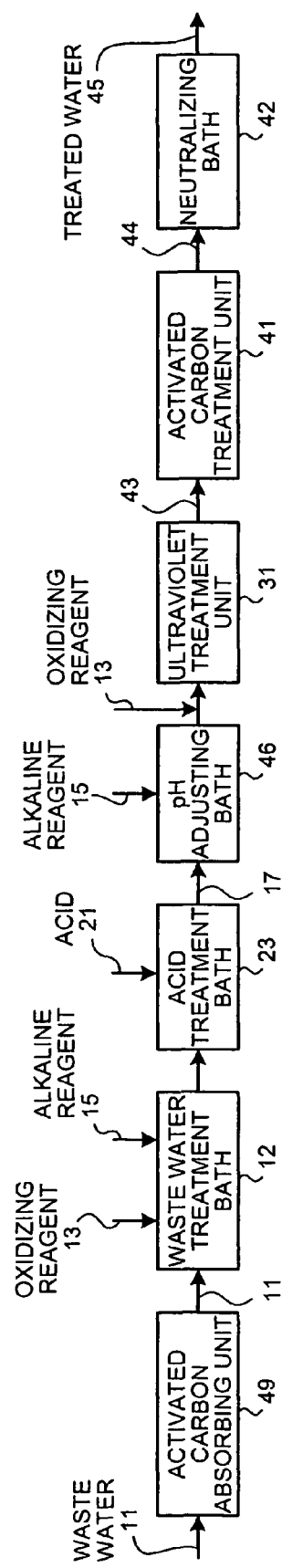
FIG. 9 is a schematic diagram of a wastewater treatment apparatus according to Embodiment 8.

FIG. 9 is a schematic diagram of a wastewater treatment apparatus according to Embodiment 8.

Constituting members identical to those of the wastewater treatment apparatus according to Embodiments 1 to 7 have the same letters and symbols assigned and the descriptions of these constituting members are omitted.

As shown in FIG. 9, in a wastewater treatment apparatus according to Embodiment 8, an activated carbon absorbing unit 49 is provided on the front stream side of the wastewater treatment bath 12 in the apparatus according to Embodiment 5.

In the wastewater discharged from, for example a coal gasification facility, such as thiosulfuric acid and formic acid, as well as other unknown COD components are contained. The unknown COD components include organic materials. Among the COD components, some tend to be absorbed by an activated carbon, therefore, the activate carbon filled in the activated carbon absorbing unit 49 is forced to absorb these components in advance, thereby reducing the burden on the oxidization treatment and an advanced oxidization treatment with the oxidizing reagent.

Embodiment 9

A wastewater treatment apparatus according to Embodiment 9 of the present invention is described below in reference to the accompanying drawings.

Figure 10:
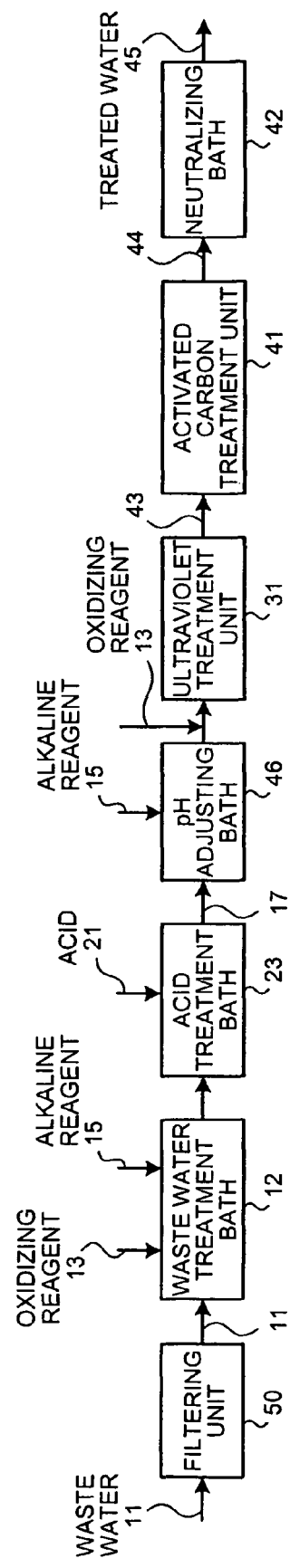
FIG. 10 is a schematic diagram of a wastewater treatment apparatus according to Embodiment 9.

FIG. 10 is a schematic diagram of a wastewater treatment apparatus according to Embodiment 9.

Constituting members identical to those of the wastewater treatment apparatus according to Embodiments 1 to 7 have the same letters and symbols assigned and the descriptions of these constituting members are omitted.

As shown in FIG. 10, in the wastewater treatment apparatus according to Embodiment 9, a filtering unit 50 is provided on the front stream side of the wastewater treatment bath 12 in the apparatus according to Embodiment 5.

Among the components contained in the wastewater, for example, some of suspended matters contain the components that react with the oxidizing reagent 13. For this reason, as shown in FIG. 10, the suspended matters in the wastewater are removed previously in the filtering unit 50, thereby reducing the burden on the subsequent oxidation treatment or an advanced oxidation treatment with the oxidizing reagent 13. The filtering unit 50 is exemplified by, for example, a sand filtering tower, a cartridge filter, a MF film, a ceramic film, a UF film and the like.

Embodiment 10

A gasification facility having the wastewater treatment apparatus according to Embodiment 10 of the present invention is described in reference to the accompanying drawings.

Figure 11:
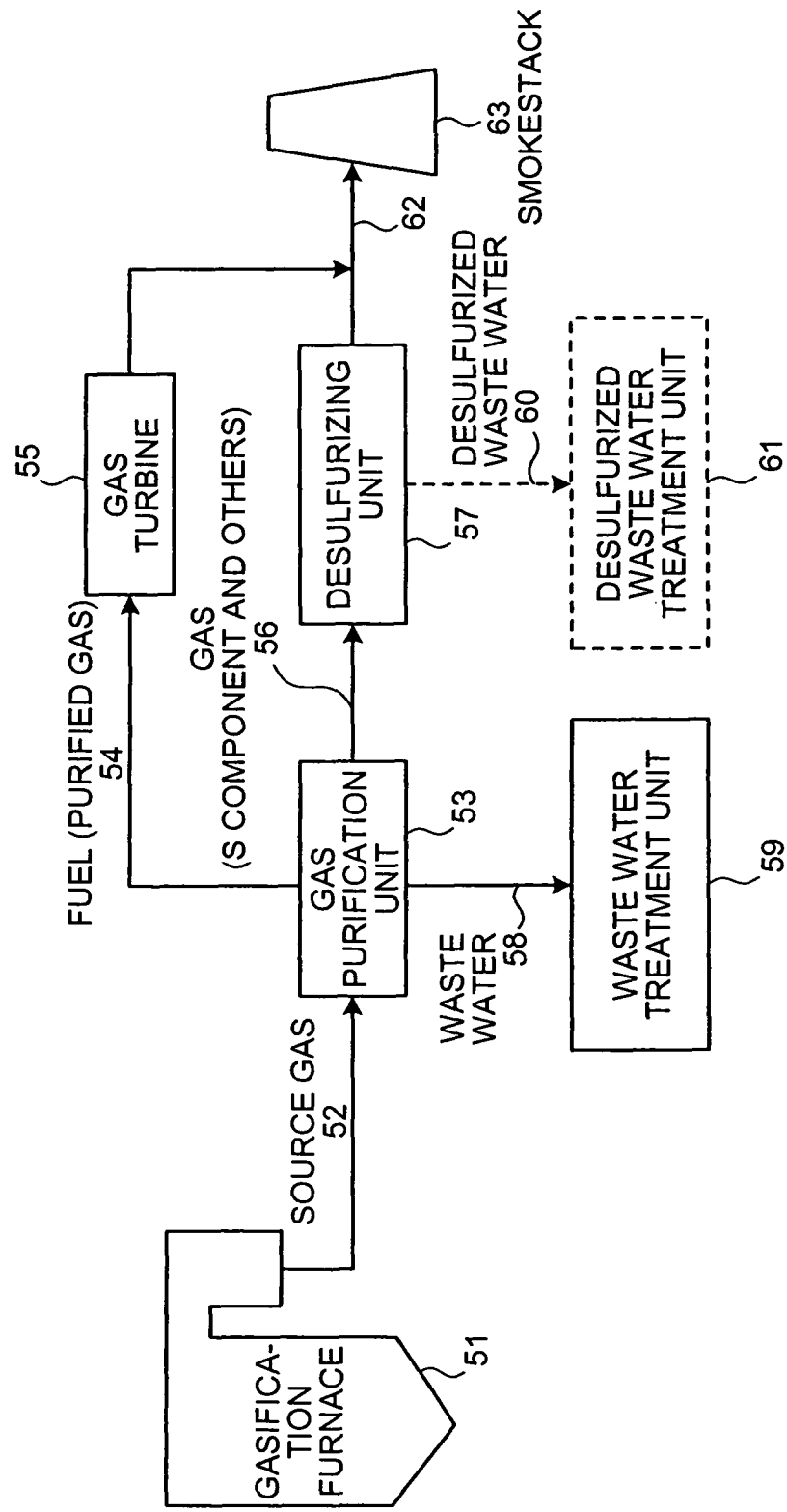
FIG. 11 is a schematic diagram of a gasification facility having a wastewater treatment apparatus according to Embodiment 10.

FIG. 11 is a schematic diagram of a gasification facility.

As shown in FIG. 11, the gasification facility is composed of a gasification furnace 51 for gasifying a gasifying agent, a wet gas purification unit 53, for example, a water scrubber, for purifying gasified source gas 52, a gas turbine 55 for driving a turbine using fuel 54, that is a purified gas, a desulfurizing unit 57 for desulfurizing gas 56 containing sulfur content from the gas purification unit 53, a wastewater treatment unit 59 for treating wastewater 58 discharged from gas purification unit 53, a desulfurized wastewater treatment unit 61 for treating the desulfurized wastewater 60 discharged from the desulfrizing unit 57, and a smokestack 63 that exhausts the treated gas 62.

The wastewater treatment apparatus according to Embodiment 10 is used as a unit that treats the wastewater 58 discharged from the gas purifying unit 53 to treat the COD components contained in the wastewater.

Experimental Example 1

Taking an experimental example mentioned below, the effects of the treatment of the COD components contained in the wastewater according to the present invention is described.

The treatment of the wastewater containing 193 mg/L of COD concentration is explained based on FIG. 5.

The COD components in the wastewater 11 include 171 mg/L of COD component derived from thiosulfuric acid, 8 mg/L of COD component derived from formic acid, and 14 mg/L of COD component derived from any other substance.

First of all, in a first oxidation process executed in the wastewater treatment bath 12, 1,000 mg/L of hypochlorous acid was added as the oxidizing reagent 13. The pH value was kept at the level of pH 8 to 10 by adding the alkali chemicals 15 (for example, caustic soda) in a first oxidation process.

The treated water 17 from the first oxidation process was fed to a second oxidization process in the acid treatment bath 23, in which the water was kept at pH 2 to 3 with acid (hydrochloric acid, sulfuric acid, etc.) to completely oxidize the thiosulfuric acid with the remaining oxidizing reagent.

After this complete oxidization, the concentration of COD components in the wastewater was 21 mg/L.

Next, this water was fed to an ultraviolet reaction process in the ultraviolet treatment unit 31.

In the ultraviolet reaction process, the UV was irradiated on the water to decompose the organic materials, such as formic acid.

When the flow rate of the wastewater 11 was 17 m³/h, the power consumption of the UV lamp was 10 to 30 kW and preferably, 15 to 25 kW. This process decreased the concentration of COD components to 12 mg/L.

Since an excessive oxidizing reagent is remained in the ultraviolet treated water 43, the water 43 was fed to the activated carbon process in the activated carbon treatment unit 41 to reduce the excessive oxidizing reagent. In an activated carbon process, some of remaining organic materials were absorbed to finally treat the COD components.

The activated carbon treated water 44 was fed to a neutralizing process in the neutralizing bath 42 for neutralizing the water with the acid 21 and the alkali chemicals 15, and then discharged.

Experimental Example 2

This experiment is an example performed in a batch process.

Figure 15:
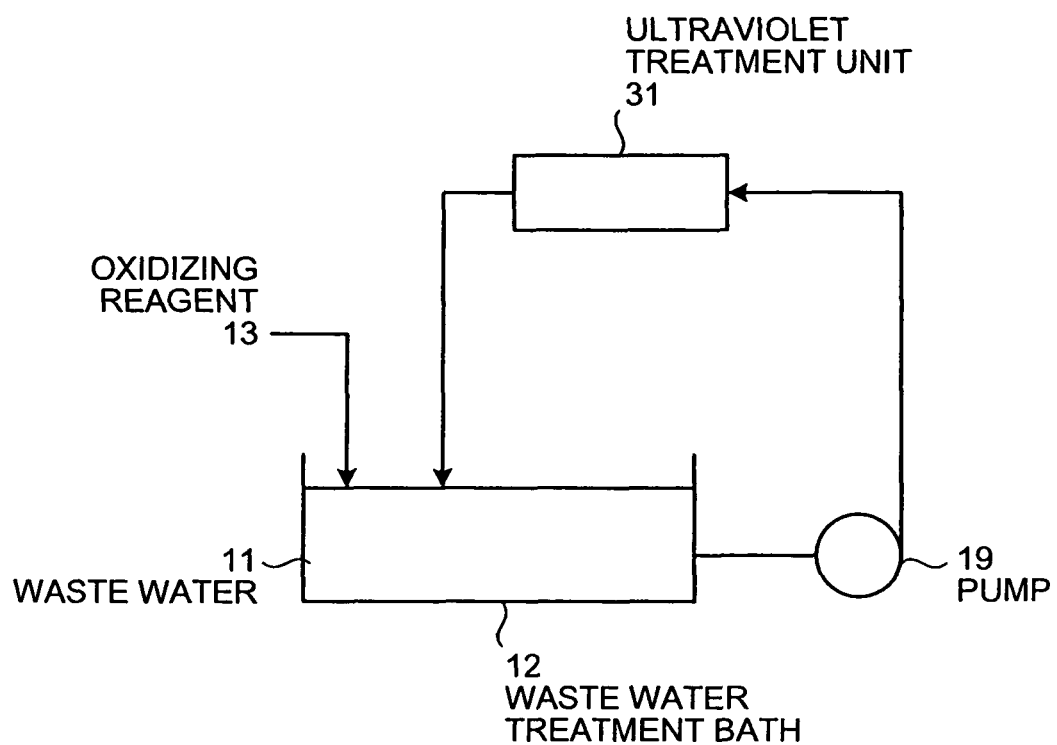
FIG. 15 is a schematic diagram of a wastewater treatment apparatus according to Experimental Examples.

FIG. 15 is a schematic diagram of a wastewater treatment apparatus in the batch process.

As shown in FIG. 15, the COD components were decomposed by two processes; one being a process for oxidizing the wastewater 11 in the wastewater treatment bath 12 by adding the oxidizing reagent 13, and the other being an advanced oxidization process for advanced-oxidizing the oxidized water 17 fed to the ultraviolet treatment unit 31 using a pump with a combination of the UV and the oxidizing reagent.

The wastewater 11 containing the COD components was fed into the wastewater treatment bath 12. The wastewater 11 was fed to the ultraviolet treatment unit 31 using the pump 19 and then returned to the wastewater treatment bath 12. The oxidizing reagent 13 (hydrogen peroxide or hypochlorite) was added in the wastewater 11. The oxidizing reagent may be added any point on a piping laid between the wastewater treatment bath 12 and the ultraviolet treatment unit 31. In this experiment, the oxidizing reagent 13 was added directly into the wastewater treatment bath 12.

When the oxidizing reagent 13 was added in the wastewater 11 and the UV was irradiated, a hydroxyl radical, which decomposes the organic materials including formic acid, was produced and therefore, the concentration of COD components decreased. An oxidative reaction using the hydroxyl radical is generally called an advanced oxidization.

For example, the main COD components of the wastewater discharged from the coal gasification process are thiosulfuric ions ($S_2O_3^{2-}$) and formic acid (HCOOH).

When the oxidizing reagent is added in the wastewater containing thiosulfuric ions, the thiosulfuric ions are oxidized down to the sulfate ions. However, when the oxidization is insufficient, the oxidization process may be stopped at the tetrathionic acid ($S_4O_6^{2-}$).

When hydrogen peroxide was added to the wastewater containing 164 mg/L of (85 mg/L as the converted COD concentration) thiosulfuric ions so that its concentration became 500 to 1,000 mg/L, the pH value was adjusted to the 8 to 10 level, and the wastewater was treated for 30 to 90 minutes (preferably, 60 to 80 minutes) keeping the current pH value. The concentration of thiosulfuric acid decreased to 11 mg/L and tetrathionic acid was less than 1 mg/L. Hydrochloric acid was added in this solution to adjust the pH value to 2 and the solution was treated for 20 to 60 minutes (preferably, 30 to 40 minutes). Thiosulfuric acid and tetrathionic acid were treated to less than 1 mg/L. At that time, the concentration of formic acid merely lowered from 158 mg/L of the initial concentration to 147 mg/L (16 mg/L as the converted COD concentration).

After the hydrogen peroxide in this treated wastewater was reduced, 500 mg/L (a range experiments were performed was 150 to 700 mg/L) of hydrogen peroxide was added again. The treated water was fed into the wastewater treatment bath 12 shown in FIG. 15. Using the ultraviolet treatment unit 31-1 shown in FIG. 12, the wastewater was circulated and advanced oxidization was applied while the UV was being irradiated by a 16 Watt low-pressure UV lamp at main wave length of which is 254 nm. The COD concentration was decreased to 3 mg/L during 6 minutes.

Experimental Example 3

After the wastewater treated with hydrogen peroxide was once reduced, 500 mg/L (a range experiments were performed was 150 to 700 mg/L) of hydrogen peroxide was added again. The treated water was fed into the wastewater treatment bath 12 shown in FIG. 15. Using the ultraviolet treatment unit 31-1 shown in FIG. 13, the wastewater was circulated and advanced oxidization was applied while the UV was being irradiated by two 28 Watt low-pressure UV lamp at main wave length of which is 254 nm. The COD concentration was decreased to 5 mg/L during 60 minutes.

Experimental Example 4

Sodium hypochlorite with 12% of effective chlorine concentration was added in the wastewater containing 164 mg/L (85 mg/L as the converted COD concentration) of thiosulfuric ions so that the concentration of the sodium hypochlorite in the solution became 1,000 to 3,000 mg/L. The pH value was adjusted to the level of 8 to 10, and the solution was treated for 60 to 180 minutes (preferably 90 to 120 minutes) keeping the current pH level. The concentration of thiosulfuric acid was decreased to 1 mg/L and the concentration of tetrathionic acid became approximately 40 mg/L as the converted COD concentration. Hydrochloric acid was added in this solution to adjust the pH value to 2 and the solution was treated for 30 to 120 minutes (preferably, 50 to 90 minutes). Tetrathionic acid was treated to about 20 mg/L. At that time, the concentration of formic acid merely lowered from 158 mg/L of initial concentration merely to 145 mg/L (16 mg/L as the converted COD concentration).

After the wastewater treated with hypochlorous acid was once reduced, 160 mg/L of hypochlorous acid was added in the wastewater treatment bath 12 shown in FIG. 15 again. Using the ultraviolet treatment unit 31-3 shown in FIG. 14, the wastewater was circulated while the UV was being irradiated by a 16 Watt low-pressure UV lamp at main wavelength of which is 254 nm. The COD concentration was decreased to 6 mg/L during 10 minutes.

By combining two processes of the oxidization process and the advanced oxidization process, the COD concentration of the wastewater was reduced from 102 mg/L of the initial concentration to 6 mg/L or less.

INDUSTRIAL APPLICABILITY

The wastewater treatment apparatus according to the present invention is capable of efficiently treating the COD components in the wastewater and suitable for treating the wastewater discharged from, for example, the gasification facility.

The invention claimed is:

1. A wastewater treatment apparatus capable of removing COD components contained in a wastewater which includes the COD components produced and discharged in a gas purification process of a gasification facility comprising:
   a wastewater treatment bath that treats the wastewater containing the COD components under alkaline conditions;
   an alkaline reagent adding unit that adds an alkaline reagent in the wastewater treatment bath so that a pH of the wastewater treatment bath is within a range from 7 to 12 based upon the alkaline reagent;
   an oxidizing reagent adding unit that adds an oxidizing reagent in the wastewater treatment bath to decompose the COD components;
   an ultraviolet treatment unit that irradiates an ultraviolet ray for decomposing the COD components;
   a pump that feeds an oxidizing water oxidized in the wastewater treatment bath and thereafter returns the same to the wastewater treatment bath, so as to circulate the wastewater; and
   an acid treatment bath having an acid adding unit that adds acid, the acid treatment bath provided on a downstream side of the wastewater treatment bath and on an upstream side of the ultraviolet treatment unit, wherein the acid treatment bath has a pH within a range of 2 to 4,
   wherein the ultraviolet treatment unit comprises:
   an ultraviolet ray-transmitting reaction bath that receives the oxidized water fed from the pump therein, wherein the ultraviolet ray-transmitting reaction bath is arranged on the downstream side of the acid treatment bath; and
   a pair of ultraviolet lamps disposed outside the reaction bath, so that an ultraviolet ray emitted from the pair of ultraviolet lamps passes through the ultraviolet ray-transmitting reaction bath and is irradiated on the oxidized water to decompose the COD components in the oxidized water.

2. The wastewater treatment apparatus according to claim 1, wherein a concentration ratio of (oxidizing reagent carried-in effective oxygen amount (mg/L))/COD concentration in wastewater (mg/L)) in the wastewater treatment bath falls within a range from 10 to 0.7.

3. The wastewater treatment apparatus according to claim 1, wherein a concentration ratio of (oxidizing reagent carried-in effective oxygen amount (mg/L))/COD concentration in wastewater (mg/L)) in the ultraviolet treatment unit falls within a range from 20 to 0.5.

4. The wastewater treatment apparatus according to claim 1, wherein an activated carbon bath and a neutralizing bath are provided on the downstream side of the ultraviolet treatment unit.

5. The wastewater treatment apparatus according to claim 1, wherein a reducing bath is provided on the downstream side of the ultraviolet treatment unit.

6. The wastewater treatment apparatus according to claim 5, wherein an aeration bath is provided on the downstream side of the reducing bath.

7. The wastewater treatment apparatus according to claim 1, wherein an activated carbon absorbing unit for removing organic materials and/or a filtering unit for removing suspended matters in the wastewater is provided as a pre-processing unit.

8. A wastewater treatment apparatus capable of removing COD components contained in a wastewater which includes the COD components produced and discharged in a gas purification process of a gasification facility comprising:
   a wastewater treatment bath that treats the wastewater, containing the COD components under alkaline condition;
   an alkaline reagent adding unit that adds an alkaline reagent in the wastewater treatment bath so that a pH of the wastewater treatment bath is within a range from 7 to 12 based upon the alkaline reagent;
   an oxidizing reagent adding unit that adds an oxidizing reagent in the wastewater treatment bath to decompose the COD components;
   a pump that feeds an oxidized water oxidized in the wastewater treatment bath and thereafter returns the same to the wastewater treatment bath, so as to circulate the wastewater;
   an ultraviolet treatment unit including:
      a reaction bath that receives the oxidized water fed from the pump therein; and
      an ultraviolet lamp that irradiates an ultraviolet ray toward the oxidized water in the reaction bath to decompose the COD components in the oxidized water;
   an acid treatment bath that has an acid adding unit for adding an acid, the acid treatment bath provided on a downstream side of the wastewater treatment bath and on an upstream side of the ultraviolet treatment unit, wherein the acid treatment bath has a pH within a range of 2 to 4.

9. The wastewater treatment apparatus according to claim 8, wherein the wastewater treatment bath accommodates a concentration ratio of (oxidizing reagent carried-in effective oxygen amount (mg/L))/COD concentration in wastewater (mg/L)) in the wastewater treatment bath falling within a range from 10 to 0.7.

10. The wastewater treatment apparatus according to claim 8, wherein the wastewater treatment bath accommodates a concentration ratio of (oxidizing reagent carried-in effective oxygen amount (mg/L))/COD concentration in wastewater (mg/L)) in the ultraviolet treatment unit falling within a range from 20 to 0.5.

* * * * *